United States Patent
Yamaka

[15] 3,707,695
[45] Dec. 26, 1972

[54] INFRARED INTENSITY DETECTOR USING A PYROELECTRIC POLYMER

[72] Inventor: Eiso Yamaka, Osaka, Japan

[73] Assignee: Matsushita Electric Industrial Company, Limited, Osaka, Japan

[22] Filed: Oct. 19, 1971

[21] Appl. No.: 190,498

[30] Foreign Application Priority Data

Oct. 20, 1970 Japan ....................45/92962
Oct. 20, 1970 Japan ....................45/92963

[52] U.S. Cl. ....................338/18, 250/83 R
[51] Int. Cl. ....................H01c 7/08
[58] Field of Search ..........338/18; 250/83 R, 83.3 H

[56] References Cited

UNITED STATES PATENTS

| | | | |
|---|---|---|---|
| 2,587,674 | 3/1952 | Aiken | 338/18 |
| 2,981,913 | 4/1961 | Barnes et al. | 338/18 |
| 3,080,542 | 3/1963 | Long | 338/18 |

*Primary Examiner*—C. L. Albritton
*Attorney*—John Lezdey

[57] ABSTRACT

An infrared sensitive thin film composed of a polymer compound having a pyroelectric property. Because of high formability of the polymer, the infrared sensitive thin film is readily formed into a desired configuration to have quick responsiveness and high sensitivity.

5 Claims, 1 Drawing Figure

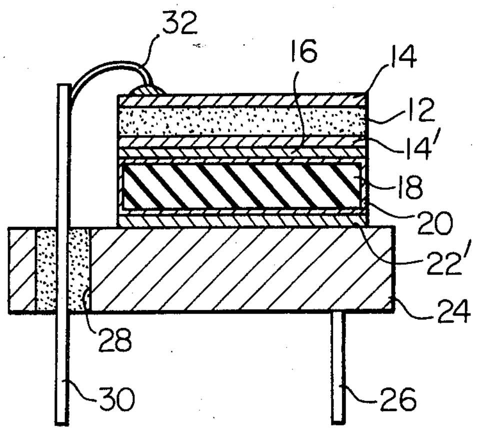
INVENTOR
EISO YAMAKA
BY
ATTORNEY

INFRARED INTENSITY DETECTOR USING A PYROELECTRIC POLYMER

This invention relates to an infrared intensity detector and more particularly to an infrared intensity detector utilizing a pyroelectric polymer compound which has a desirable formability.

Conventional infrared intensity detectors utilizing pyroelectricity comprise infrared sensitive elements composed of a single- or poly-crystallines of dielectric material having prominent pyroelectric property, such as, lithium niobate, glycinium sulfate lead titanate etc. For the sake of quick responsiveness it is desired that the sensitive element should be made thinner than about 20μm. In addition, the sensitive element should be made considerably wide so as to provide high sensitivity and, in some cases, should be variously formed for the preferred configuration of the detector.

However, a difficulty is encountered in such formation of the infrared sensitive element as above mentioned since the dielectric crystalline materials all have great hardness and high cleavability. As a result, the conventional infrared intensity detector using a single- or poly-crystalline of the dielectric material can not be formed to have a sufficient responsiveness or sensitivity.

It is therefore an object of the present invention to provide an infrared intensity detector having an extremely high responsiveness.

Another object of the invention is to provide an infrared intensity detector having a readily formable infrared sensitive element.

Another object of the invention is to provide an infrared intensity detector comprising an infrared sensitive element composed of a pyroelectric polymer compound.

Another object of the invention is to provide an infrared intensity detector of a simple construction.

The infrared intensity detector according to the present invention comprises an infrared sensitive thin film composed of a polymer, such as, polyvinyl chloride, polyvinyl fluoride, polyvinylidene fluoride, nylon, all of which have prominent pyroelectric characteristics. These polymer compounds are so readily formable as to be readily formed thinner than 10μm and sufficiently large.

The nature and details of the invention will be more clearly apparent by reference to the following description when taken in conjunction with the accompanying drawing which is a sectional view of an infrared intensity detector 10 of the present invention, which comprises an infrared sensitive element 12 composed of a polymer compound having pyroelectric property. The infrared sensitive film 12 has a thickness preferably below 20μm, so that the element 12 has a sufficiently small heat capacity and therefore has a remarkably quick responsiveness. In this instance, it is to be understood that such polymer compounds as above mentioned all are remarkably easy to form and the film 12 is readily formed as thin as above and large enough for a desired area. On both surfaces of the film 12 two electrodes 14 and 14' are disposed which are composed of a material having a small absorption coefficient for infrared ray, for example, gold, nickel, nickel chromium, or aluminum. The electrode 14' is connected through an electrically conductive adhesive agent 16 to one surface of a support member 18 coated with a continuous conductive film 20. The conductive film 20 is preferably made of tin oxide. The other surface of the support member 18 is connected through an electrically conductive adhesive agent 22 to one surface of a metal plate 24. One conductive lead 26 is connected to a suitable portion of the metal plate 24 thereby to serve as one terminal of the infrared intensity detector 10. In the metal plate 24, furthermore, there is provided with a bore 28 penetrating therethrough. A second conductive lead 30 is inserted into the bore 28 and fastened to the bore 28 through an insulating filler. One end of the other conductive lead 30 is connected to the other electrode 14 through a wire 32 whereby the second lead 30 acts as the other terminal.

Since the infrared sensitive film or element of the detector of the present invention can be formed desiredly thin and large because of the ready formability of the polymer compound, the detector has sufficient responsiveness and sensitivity. In addition, the detector is suitable for mass production because of its simple and compact construction.

It will be understood that the invention is not to be limited to the exact construction shown and described and that various changes and modifications may be made without departing from the spirit and scope of the invention as defined in the appended claims.

What is claimed is:

1. An infrared intensity detector, which comprises:
   - an infrared sensitive film made of a pyroelectrical polymer material;
   - two thin electrodes made of a material allowing an infrared ray to penetrate therethrough and disposed on both surfaces of said thin film;
   - a support member composed of an insulating material and having its surface coated with a continuous conductive film which has a surface connected to one of said two thin electrodes through an electrically conductive adhesive agent;
   - a metal plate connected with another surface of said conductive film and having a bore penetrating therethrough;
   - a first electrical conductive lead connected to said metal plate; and
   - a second electrical conductive lead connected at its one end to the other electrode.

2. An infrared intensity detector according to claim 1, wherein said pyroelectric polymer material is selected from the group consisting of polyvinyl chrolide, poly-vinyl fluoride polyvinylidene fluoride, and nylon.

3. An infrared intensity detector according to claim 1, wherein said infrared transparent material is selected from the group consisting of gold, nickel, nickel chromium and aluminum.

4. An infrared intensity detector according to claim 1, wherein said continuous conductive film is made of tin oxide.

5. An infrared intensity detector according to claim 1, wherein said infrared sensitive film is thinner than 20μm.

* * * * *

3563
106012 0501